US011729176B2

United States Patent
Anand et al.

(10) Patent No.: US 11,729,176 B2
(45) Date of Patent: Aug. 15, 2023

(54) MONITORING AND PREVENTING OUTBOUND NETWORK CONNECTIONS IN RUNTIME APPLICATIONS

(71) Applicant: IMPERVA, INC., San Mateo, CA (US)

(72) Inventors: Kunal Anand, Marina Del Rey, CA (US); Richard Meester, Camarillo, CA (US); Joseph Rozner, Northridge, CA (US); Martin Ryan, Los Angeles, CA (US)

(73) Assignee: Imperva Inc., San Mateo, CA (US)

( * ) Notice: Subject to any disclaimer, the term of this patent is extended or adjusted under 35 U.S.C. 154(b) by 297 days.

(21) Appl. No.: 16/656,473

(22) Filed: Oct. 17, 2019

(65) Prior Publication Data

US 2020/0213322 A1    Jul. 2, 2020

Related U.S. Application Data

(60) Provisional application No. 62/786,313, filed on Dec. 28, 2018.

(51) Int. Cl.
*H04L 9/40* (2022.01)
*G06N 20/00* (2019.01)

(52) U.S. Cl.
CPC ........... *H04L 63/102* (2013.01); *G06N 20/00* (2019.01); *H04L 63/0876* (2013.01);
(Continued)

(58) Field of Classification Search
CPC ..... H04L 63/102; H04L 63/20; H04L 63/123; H04L 63/0876; H04L 63/1433; H04L 63/104; G06N 20/00; G06F 21/554
See application file for complete search history.

(56) References Cited

U.S. PATENT DOCUMENTS 9,489,456 B1 * 11/2016 Vidwans ............... G06F 16/951
10,191,831 B2 * 1/2019 Soeder ............... G06F 11/3466
(Continued)

OTHER PUBLICATIONS

P. Cisar and S. M. Cisar, "The framework of runtime application self-protection technology," 2016 IEEE 17th International Symposium on Computational Intelligence and Informatics (CINTI), 2016, pp. 000081-000086, doi: 10.1109/CINTI.2016.7846383. (Year: 2016).*

(Continued)

*Primary Examiner* — Jung W Kim
*Assistant Examiner* — Sameera Wickramasuriya
(74) *Attorney, Agent, or Firm* — Nicholson, De Vos, Webster & Elliott, LLP

(57) ABSTRACT

A runtime application self protection (RASP) plug-in logic monitors for, and prevents, outbound network connections that are initiated by server application logic and that are not intended by the application logic. The RASP plug-in has access to information generally available only to the application logic and identifies specific vulnerabilities within the application logic that can be patched. The vulnerabilities are identified by (i) data identifying the portion(s) of the application logic that is the source of the vulnerability and (ii) data identifying the authenticated user, if any, that is the source of the attack. The RASP plug-in catches and identifies specific attacks on the application logic in real-world, production operation.

18 Claims, 8 Drawing Sheets

(52) U.S. Cl.
CPC ........ *H04L 63/123* (2013.01); *H04L 63/1433* (2013.01); *H04L 63/20* (2013.01)

(56) References Cited

U.S. PATENT DOCUMENTS

| | | | |
|---|---|---|---|
| 10,956,574 B2* | 3/2021 | Conikee | G06F 21/554 |
| 2005/0138111 A1* | 6/2005 | Aton | G06F 11/3476 |
| | | | 709/201 |
| 2005/0216956 A1* | 9/2005 | Orr | H04L 63/1441 |
| | | | 726/23 |
| 2006/0174337 A1* | 8/2006 | Bernoth | H04L 63/0263 |
| | | | 726/11 |
| 2007/0005801 A1* | 1/2007 | Kumar | H04L 63/08 |
| | | | 709/238 |
| 2009/0199276 A1* | 8/2009 | Schneider | H04L 63/0815 |
| | | | 726/5 |
| 2010/0199345 A1* | 8/2010 | Nadir | H04L 63/02 |
| | | | 726/11 |
| 2012/0173612 A1* | 7/2012 | Vegesna-Venkata | H04L 67/02 |
| | | | 709/203 |
| 2013/0019314 A1* | 1/2013 | Ji | H04L 63/168 |
| | | | 726/25 |
| 2014/0283083 A1* | 9/2014 | Gula | H04L 63/1433 |
| | | | 726/25 |
| 2014/0283096 A1* | 9/2014 | Neerumalla | G06F 16/24564 |
| | | | 726/26 |
| 2015/0052607 A1* | 2/2015 | Al Hamami | H04L 67/1002 |
| | | | 726/23 |
| 2016/0119344 A1* | 4/2016 | Freitas Fortuna dos Santos | G06F 40/143 |
| | | | 726/7 |
| 2016/0164837 A1* | 6/2016 | Wu | H04L 67/02 |
| | | | 726/11 |
| 2017/0279609 A1* | 9/2017 | Cho | H04L 63/105 |
| 2017/0316202 A1* | 11/2017 | Roichman | G06F 21/577 |
| 2018/0107821 A1* | 4/2018 | Eshkenazi | G06F 9/328 |
| 2018/0189052 A1* | 7/2018 | Al Hamami | G06F 21/552 |

OTHER PUBLICATIONS

J. Sheppard, "Cloud Investigations of Illegal IPTV Networks," 2018 17th IEEE International Conference On Trust, Security And Privacy In Computing And Communications/ 12th IEEE International Conference On Big Data Science And Engineering (TrustCom/BigDataSE), 2018, pp. 1942-1947 (Year: 2018).*

Papadopoulos, Elias P., et al. "The long-standing privacy debate: Mobile websites vs mobile apps." Proceedings of the 26th International Conference on World Wide Web. 2017. (Year: 2017).*

* cited by examiner

```
{
  "timestamp": "Jul 17 2018 21:27:47 UTC",
  "vendor": "Prevoty",                                              600
  "product": "RASP",
  "product_version": "3.10.0",
  "mode": "protect",
  "action": "blocked",
  "severity": "high",
  "category": "Network Activity",
  "direction": "inbound",
  "engine": "network",
  "app": "Acme",
  "application_metadata": {},
  "app_lang": "java",
  "app_version": "1.8.0_171",
  "vm_runtime_version": "25.171-b11",
  "os": "Mac OS X",
  "os_version": "10.13.5",
  "user": "ka",
  "src_ip": "0:0:0:0:0:0:0:1",
  "src_port": 59774,
  "dest_ip": "0:0:0:0:0:0:0:1",
  "dest_port": 8082,
  "http_content_type": "application/x-www-form-urlencoded; charset=UTF-8",
  "http_method": "POST",
  "http_referrer": "http://localhost:8082/acme-webapp-java/",
  "http_user_agent": "Mozilla/5.0",
  "session_creation_time": "Jul 17 2018 21:26:28 UTC",
  "session_is_new": false,
  "transport": "tcp",
  "uri_path": "/acme-webapp-java/network-call",
  "url": "http://localhost:8082/acme-webapp-java/network-call",
  "cookies": {
    "JSESSIONID": "e6qem5upsajc194ghyl48sokj"
  },
  "session_attributes": {
    "ACME Username": "acme_default_user",
    "ACME Role": "user"
  },
  "network_activity_protocol": "tcp",
  "network_activity_destination": "blah.com",
  "network_activity_port": 8888,
  "line_number": 100,
  "script_name": "File2.java",
  "stack_trace": "File3.java:150\nFile2.java:100\nFile1.java:50"
}
```

FIGURE 6

MONITORING AND PREVENTING OUTBOUND NETWORK CONNECTIONS IN RUNTIME APPLICATIONS

CROSS REFERENCE TO RELATED APPLICATION

This non-provisional application claims the benefit of U.S. provisional application Ser. No. 62/786,313, filed Dec. 28, 2018, which application is incorporated herein in its entirety by this reference.

FIELD

The present invention relates generally to computer network security and, more particularly, methods of and systems for preventing malicious attacks contained within user-generated content in an online computing setting factor.

BACKGROUND

The importance of security in computer networking whose presence reaches into nearly every facet of life today cannot be over-stated. One important aspect of computer networking security addresses attacked of malicious code injected into user-provided data.

User-provided data can contain two significant attack variants: cross-site scripting (XSS) or structured query language (SQL) injection. An XSS attack exploits security vulnerabilities found in web applications. Any web server that displays user-provided data is susceptible to unwitting execution of computer instruction embedded in the user-provided data. XSS enables an attacker to inject a client-side script into web pages viewed by other users, allowing said attacker to bypass access controls. XSS is possible through malicious javascript (JS) tags/attributes/protocols, cascading style sheet (CSS) properties, and rich media tags. XSS attacks accounted for roughly 84% of all security vulnerabilities documented by a major security firm in 2007. XSS attacks have the ability to read and write web browser cookies (containing private user data), create web application requests on behalf of a user without acknowledgement, redirect users to malicious websites, as well as other behaviors that take advantage of a user's trust.

Current techniques for preventing XSS attacks include web application firewalls (WAF) and static and dynamic application security testing (SAST and DAST, respectively).

The simplest form of WAF includes white lists (hosts and/or ports to always transport to applications) and black lists (hosts and/or ports to never transport to applications). Most sophisticated WAF protection can analyze web traffic using signatures and pattern-matching algorithms to identify security threats. The shortcoming of WAF techniques is that they are not implemented at the application layer but instead at a lower level, e.g., session, transport, or network layers. Accordingly, WAF logic has no information regarding the particular application processing the network data and the context of such processing. For example, suppose one application in the application layer requires network connectivity to a given host and port and, for another application, that same host and port represent a serious security threat. Since WAFs are not in the application layer, WAFs provide a solution shared by all applications executing in a given environment. Application-by-application security monitoring and protection are not provided by WAFs. Moreover, given the absence of application context awareness, WAFs are notorious for generating false positives, making management and analysis of security threats costly.

Current techniques to provide application-level, and thus application-specific, security include SAST and DAST. In SAST, logic analyzes source code of a given application to determine if such source code includes any security vulnerabilities. In DAST, logic tests an application by examining an application during its execution and trying to attack the application just like an attacker would. Both SAST and DAST require that testers are already aware of the types of attacks an application might face. Applications, particularly those that execute continuously for months or even years, can enter into any of a countless number of states—far too many to test using SAST and DAST techniques.

History has shown that identifying vulnerabilities in the source code is inadequate. Larger, more complex applications can face an overwhelming number of vulnerabilities, making patching them (removing the vulnerabilities from the source code) impractical or at least very costly. Even more problematic for owners/operators of such complex application is that, typically, only a small portion of the entirety of the source code responsible for the behavior of the application is under the control of the owner/operator, generally about 20%. This can render up to 80% or more of the vulnerabilities in a given application unpatchable by the owner/operator of the application.

Accordingly, SAST and DAST techniques cannot adequately provide application security, particularly against attacks unknown to testers.

What is needed is application-aware security techniques that can protect against previously unknown attacks.

SUMMARY

In accordance with the present invention, a runtime application self protection (RASP) plug-in logic monitors for, and prevents, outbound network connections that are initiated by server application logic and that are not intended by the application logic. The RASP plug-in, unlike WAFs, has access to information generally available only to the application logic and can therefore identify specific vulnerabilities within the application logic that can be patched. Unlike SAST and DAST techniques, the RASP plug-in according to the present invention catches and identifies specific attacks on the application logic in real-world, production operation.

The harm caused by most cross-site scripting (XSS) attacks involve causing the application logic to send otherwise secure data to a remote computer, with which the application logic is not designed to communicate. Accordingly, limiting outbound network connections created by to the application logic to only those intentionally designed into the application logic provides complete and effective protection against most XSS attacks.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which:

FIG. 6 is a diagram of a log entry reporting attempted creation of an unauthorized network connection in a step of the logic flow diagram of FIG. 5;

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

In accordance with the present invention, runtime application self protection (RASP) plug-in logic 324 (FIG. 3) monitors for, and prevents, outbound network connections that are initiated by application logic 320 and that are not intended by application logic 320. The harm caused by most cross-site scripting (XSS) attacks involve causing application logic 320 to send otherwise secure data to a remote computer, with which application 302 is not originally designed to communicate. Accordingly, limiting outbound network connections created by application logic 320 to only those intentionally designed into application logic 320 provides complete and effective protection against most XSS attacks.

Figure 1:
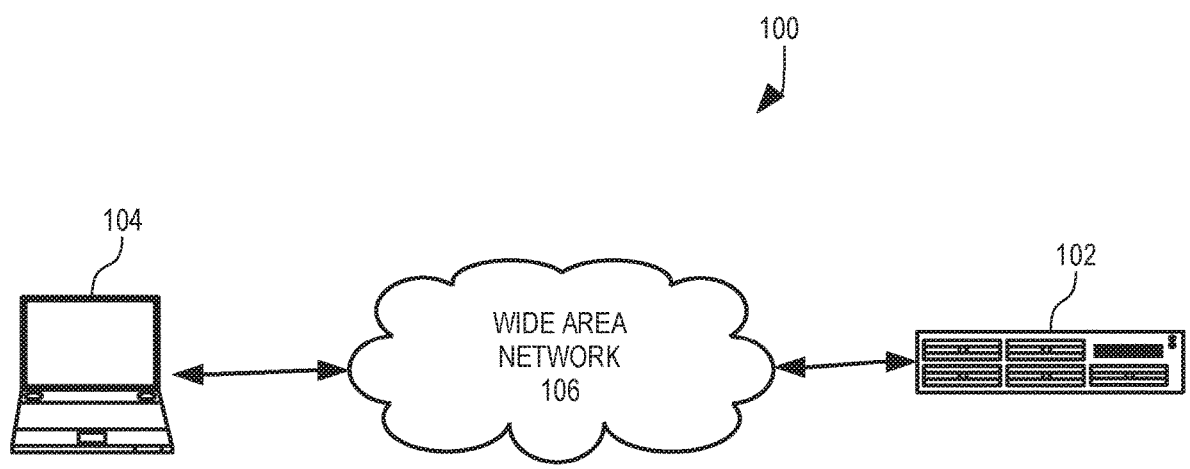
FIG. 1 is a diagram showing a wide-area network through which a client device is connected to a server computer that performs application-aware network security in accordance with one embodiment of the present invention.
Figure 3:
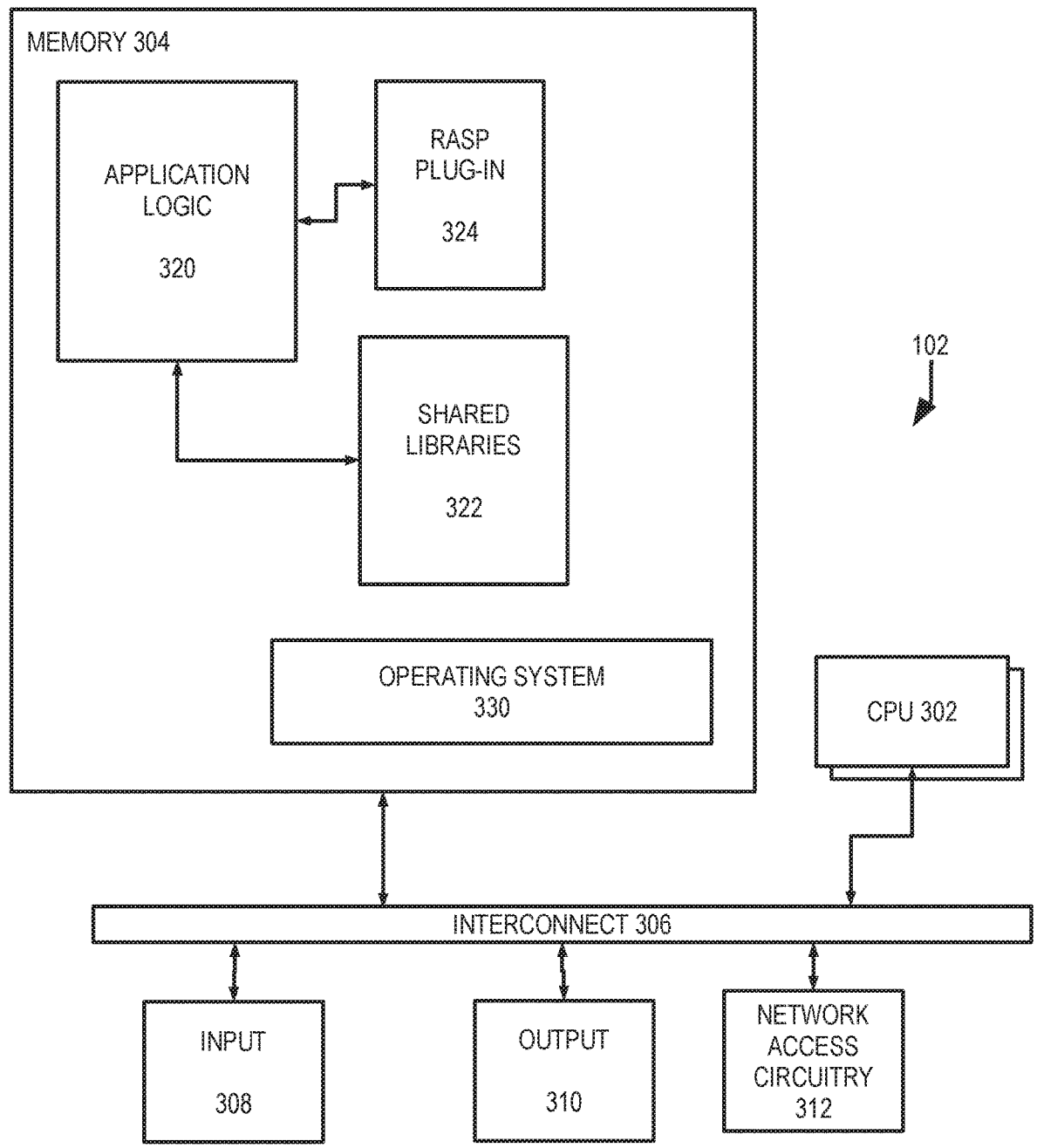
FIG. 3 is a block diagram showing the server of FIG. 1 in greater detail.

As shown in FIG. 1, network security system 100 includes a server 102 and a client computer 104 that are connected to one another though a wide area network (WAN) 106. Server 102 provides a service defined by application logic 320 (FIG. 3). Server 102 can include additional application logic to provide additional services. In addition, while server 102 is shown in FIG. 1 as a single computer system, it should be appreciated that server 102 can be implemented as multiple computer systems using known distributed computing techniques.

Client computer 104 sends to server 102 requests for the service provided by application logic 320 (FIG. 3) of server 102. While a single client computer 104 is shown in FIG. 1, it should be appreciated that server 102 can serve requests from thousands or even millions of computers through WAN 106. Such requests, e.g., requests from client computer 104, can include XSS or other attacks.

RASP plug-in logic 324 is implemented at application layer 222 (FIG. 2), providing RASP plug-in logic 324 access to data representing a current state of application logic 320 (FIG. 3) that is not available at other layers. The RASP plug-in logic 324 may also be referred to as an "agent" within this disclosure. This RASP agent may be integrally incorporated as part of the application logic, in some embodiments, or may be substantiated as a plug-in or similar closely aligned component. This differs significantly from other external protection techniques, such as external firewalls and the like for two critical reasons: 1) the agent, by being so closely integrated into the application logic is able to access telemetry data of the application logic, which is not available to firewalls or other external solutions, and 2) the nature of potential outbound data is also visible to the agent, so sensitive information such as credit card information, for example, can be safely viewed and a level of sensitivity determined. By accessing application logic telemetry, and being able to accurately determine data sensitivity, the agent is thus able to determine if the network connection is legitimate or not much better than firewall (or other external) solutions. Also note, that while the agent may be actually part of the application logic in some substantiations, for the sake of consistency within this disclosure, the agent will be routinely referred to as a plug-in. This wording choice is not intended to artificially limit the scope of the disclosure, but to increase document readability.

Figure 2:
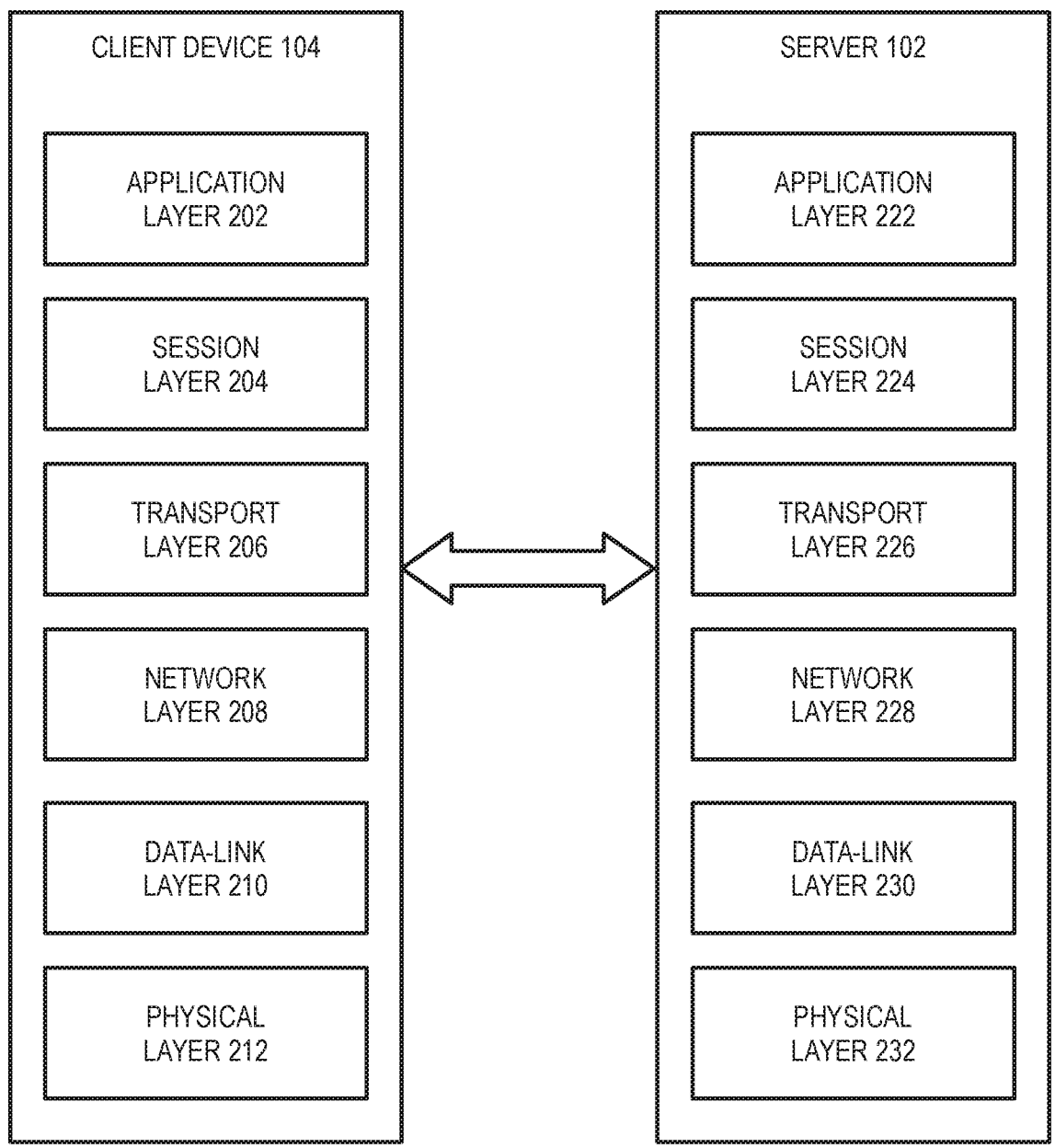
FIG. 2 is a block diagram showing various layers of a computer communication model.

To facilitate appreciation and understanding of the device-based authentication factor used in accordance with the present invention, abstraction layers of a computer communication model are briefly described. Each of the layers, as shown in FIG. 2, relies on services performed by lower layers. Accordingly, the bottom layers are briefly described first.

Physical layer 212 of client computer 104 communicates with physical layer 232 of server 102, perhaps indirectly. At the physical layer, hardware of client computer 104 physically manipulates and senses voltages, waves, phase, frequencies, and such on one or more conductive wires—by moving or sensing movement of electrons along the wires. In a wireless connection, the conductive wire(s) can be an antenna. Physical layer 232 (FIG. 2) of server 102 includes hardware (e.g., network access circuitry 312 described below in conjunction with FIG. 3) that similarly manipulates and senses physical movement of electrons along a conductive wire to send and receive signals with physical layer 212 of client computer 104 and similar physical layers of any intervening nodes there between.

Physical layers 212 and 232 provide an abstraction of the sent and received signals as bits. For example, physical layer 212 receives bits from data-link layer 210 and sends those bits by physically moving electrons along the conductive wire(s). Physical layer 232 senses physical movement of electrons along conductive wire(s) as moved by physical layer 212, or a physical layer of an intervening node, and reports the sensed movements to data-link layer 230 as received bits.

Data-link layer 210 sends and receives data packets, translating into and from bits to send and receive, respectively, through physical layer 212. Data-link 230 is directly analogous to data-link layer 210. The abstraction of bits as data packets allows higher layers to act on individual messages. Data-link layer 210 also detects and processes errors in communication at the physical layer. For example, data-link layer 210 verifies packet checksums to verify that each packet is received accurately and can re-request packets in which checksum verification fails.

Network layer 208 implements the addressing and routing structure between nodes and hosts attached to WAN 106. When a message from client computer 104 is to be sent to server 102, network layer 208 creates one or more data packets that embody the message, including addressing that is designed to route the packets to server 102. Network layer 208 implements the Internet Protocol (IP) portion of TCP/IP and UDP/IP. Network layer 228 is directly analogous to network layer 208.

Transport layer 206 provides transparent transfer of data between client computer 104 and other hosts such as server 102. Transport layer 206 processes end-to-end error recovery and flow control and ensures complete data transfer to higher layers. Examples of transport layers include the TCP portion of TCP/IP and the UDP portion of UDP/IP. Transport layer 226 is directly analogous to transport layer 206.

Session layer 204 organizes end-to-end communications links provided by transport layer 206 into a number of communication protocols. Examples include a number of file transport protocols such as HTTP and FTP; messaging protocols such as POP, IMAP, SMTP, and NNTP; and numerous other protocols. Session layer 204 also performs data reformatting such as text data encoding, text-to-binary translation, and encryption and decryption, for example. The data reformatting of session layer 204 can be attributed to a separate, presentation layer. Session layer 224 is directly analogous to session layer 204, except that server-side implementations of some network protocols can be omitted from session layer 204 in some client devices.

All of the previously described layers of FIG. 2 are typically included in an operating system of a computing device, e.g., operating system 330 of server 102. An operating system is logic implemented in a computing device that provides services used by other logic implemented in the computing device. The services typically include management of computer resources such as file systems, peripheral device support, networking services, and computer process management. Generally, most users don't directly use an operating system but rather use logic that in turn uses the operating system to perform various tasks. Examples of operating systems in use today include Linux, Unix, MacOS, and various incarnations of the Windows operating system.

Application layer 202 includes various logic used directly by human users to perform actions as directed by the user. An example of logic implemented at application layer 202 of client computer 104 is a web browser. An example of logic implemented at application layer 222 of server 102 is a web-based application that can be used through the web browser of client computer 104. Examples of such web-based applications include social networking sites, on-line stores, search engines, etc.

To facilitate appreciation and understanding of the transaction of transaction flow diagram 500 (FIG. 5, described below), the general structure of server 102 is described.

Server 102 is a computer and is shown in greater detail in FIG. 3. Server 102 includes one or more microprocessors 302 (collectively referred to as CPU 302) that retrieve data and/or instructions from memory 304 and execute retrieved instructions in a conventional manner. Memory 304 can include generally any computer-readable medium including, for example, persistent memory such as magnetic and/or optical disks, ROM, and PROM and volatile memory such as RAM.

CPU 302 and memory 304 are connected to one another through a conventional interconnect 306, which is a bus in this illustrative embodiment and which connects CPU 302 and memory 304 to one or more input devices 308, output devices 310, and network access circuitry 312. Input devices 308 can include, for example, a keyboard, a keypad, a touch-sensitive screen, a mouse, a microphone, and one or more cameras. Output devices 310 can include, for example, a display—such as a liquid crystal display (LCD)—and one or more loudspeakers. Network access circuitry 312 sends and receives data through computer networks such as wide area network 104 (FIG. 1).

Since server 102 (FIG. 3) is a server computer, server 102 does not necessarily include input and output devices but can include input devices 308 and output devices 310. In addition, while server 102 is shown to be a single computer in this illustrative embodiment, it should be appreciated that the behavior of server 102 described herein can be distributed across multiple, cooperating computer systems using conventional techniques.

A number of components of server 102 are stored in memory 304. In particular, application logic 320, shared libraries 322, RASP plug-in 324, and operating system 330 are each all or part of one or more computer processes executing within CPU 302 from memory 304 in this illustrative embodiment but can also be implemented using digital logic circuitry. As used herein, "logic" refers to (i) logic implemented as computer instructions and/or data within one or more computer processes and/or (ii) logic implemented in electronic circuitry.

Application logic 320 controls the behavior of server 102 in performing the services provided by server 102. For example, if application logic 320 implements social networking, application logic 102 controls the user interface, features, and behavior of the particular social networking implemented by application logic 320.

Shared libraries such as shared libraries 322 are known but are described briefly herein to facilitate understanding and appreciation of the present invention. Shared libraries 324 include logic that performs functions that are generally shared among multiple applications. For example, shared libraries 322 can provide logic that implements encryption tools and protocols such as MD-5 and SHA-512, for example. Accordingly, software engineers building application logic 320 can leverage from the work of others by using a shared library that implements these encryption protocols, as can developers of applications other than application logic 320.

Share libraries 322 can be dynamically linked. Dynamically linked libraries (DLLs) are loaded and linked only as needed during execution of applications such as application logic 320. DLLs are known and are not described further herein.

RASP plug-in 324 is a plug-in that augments the behavior of application logic 320. Some applications, e.g., application logic 320, include logic that checks for the presence of plug-ins and, if present, uses found plug-ins to augment or change the behavior of the application. Such logic is sometimes referred to as "hooks". RASP plug-in 324 is connected to application logic 320 with hooks that cause any network connections to be created by application logic 320 are processed by RASP plug-in 324. In this illustrative embodiment, RASP plug-in 324 is dynamically linked.

Figure 4:
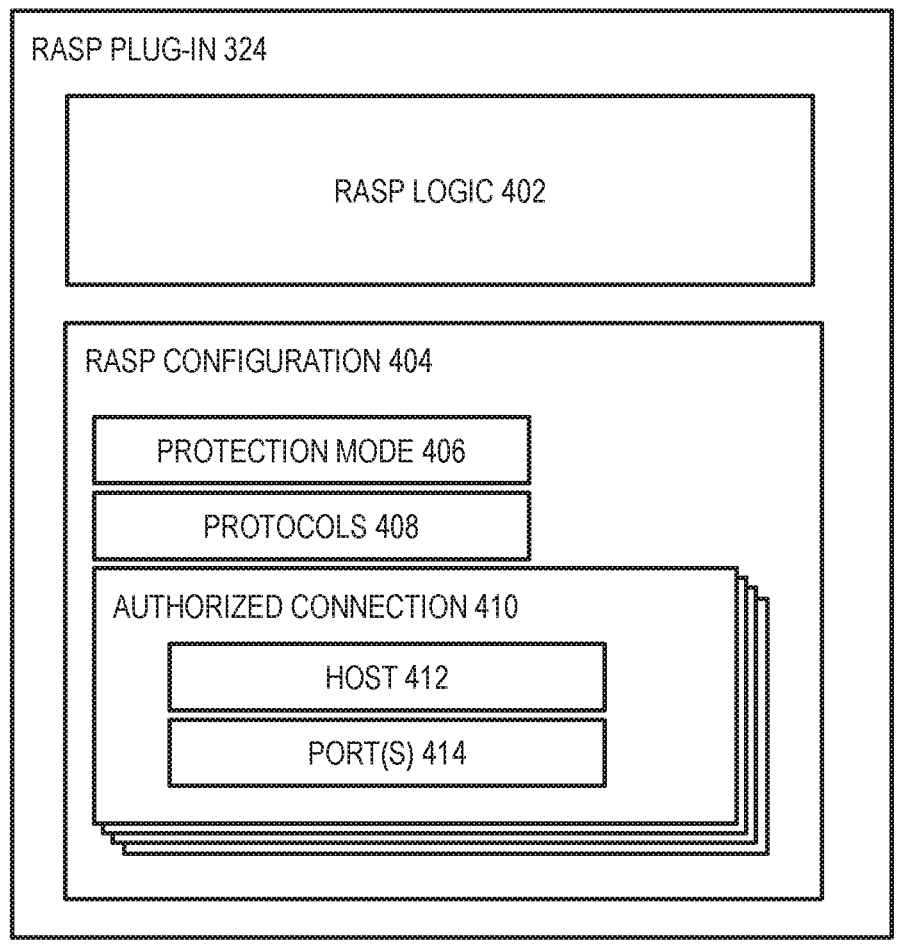
FIG. 4 is a block diagram showing a RASP agent of the server of FIG. 1 in greater detail.

RASP plug-in 324 is shown in greater detail in FIG. 4. RASP plug-in 324 includes RASP logic 402 and RASP configuration 404. RASP logic 402 is logic that defines the behavior of RASP plug-in 324. RASP configuration 404 specifies details of the behavior of RASP logic 402 specific to application logic 320.

RASP configuration 404 includes a protection mode 406, protocols 408, and authorized connections 410. Protection mode 406 specifies in which of several modes RASP logic 402 is to operate. In this illustrative embodiment, protection mode 406 specifies one of three modes: "disabled", "monitor", and "protect". In "disabled" mode, RASP logic 402 takes no action, allowing application logic 320 to act as if RASP plug-in 324 is not installed. In "monitor" mode, RASP logic 420 identifies unauthorized network connections but allows the unauthorized network connections to be created. In "protect" mode, RASP logic 420 both identifies unauthorized network connections and prevents the unauthorized network connections from being created. This behavior is described more completely below.

Protocols 408 specifies for which types of network connections by protocol RASP logic 402 is enabled. In this illustrative embodiment, protocols 408 specifies whether RASP logic 402 is enabled for all protocols or only for HTTP(S) connections. In alternative embodiments, protocols 408 can identifies multiple, specific protocols for which RASP logic 402 is enabled. Examples of such protocols include NTP, FTP, IMAP, SMTP, RDP, etc.

Authorized connections 410 each specify a host 412 and associated port(s) 414 that RASP logic 420 is to allow to be created. In this illustrative embodiment, host 412 can specify multiple hosts using wildcard characters. For example, if application logic 320 is expected to create network connections with host computers associated with a multitude of sub-domains of the domain "baz.com", host 412 can identify these host computers as "*.baz.com". In addition, host 412 can identify multiple hosts using conventional representations of ranges of IP addresses, e.g., "10.0.0.0/24". Also in this illustrative embodiment, port(s) 414 can specify multiple ports using wildcard characters and conventional representation of port ranges. For example, in port(s) 414, "80" represents the single port 80, "8000-9000" represents any port in that range, "80,8000-9000" represents both port 80 and ports 8000-9000, and "*" represents all ports.

Collectively, authorized connections 410 represents all the network connections application logic 320 is expected to make during normal operation. In some cross-site scripting (XSS) attacks, computer instructions can be injected into otherwise acceptable user content provided to application logic 320 in such a manner that are intended to cause application logic to unwittingly send information to a remote host that is accessible to the attacker. If application logic 320 is unprepared to thwart such an attack, application logic 320 can attempt to create a network connection to this host. When this host and its associated port is not specified in authorized connections 410, RASP logic 402 processes the attempted network connection. If protection mode 406 is "protect", such an attack is completely thwarted despite the absence of proper readiness of application logic 320 for such an attack.

Figure 5:
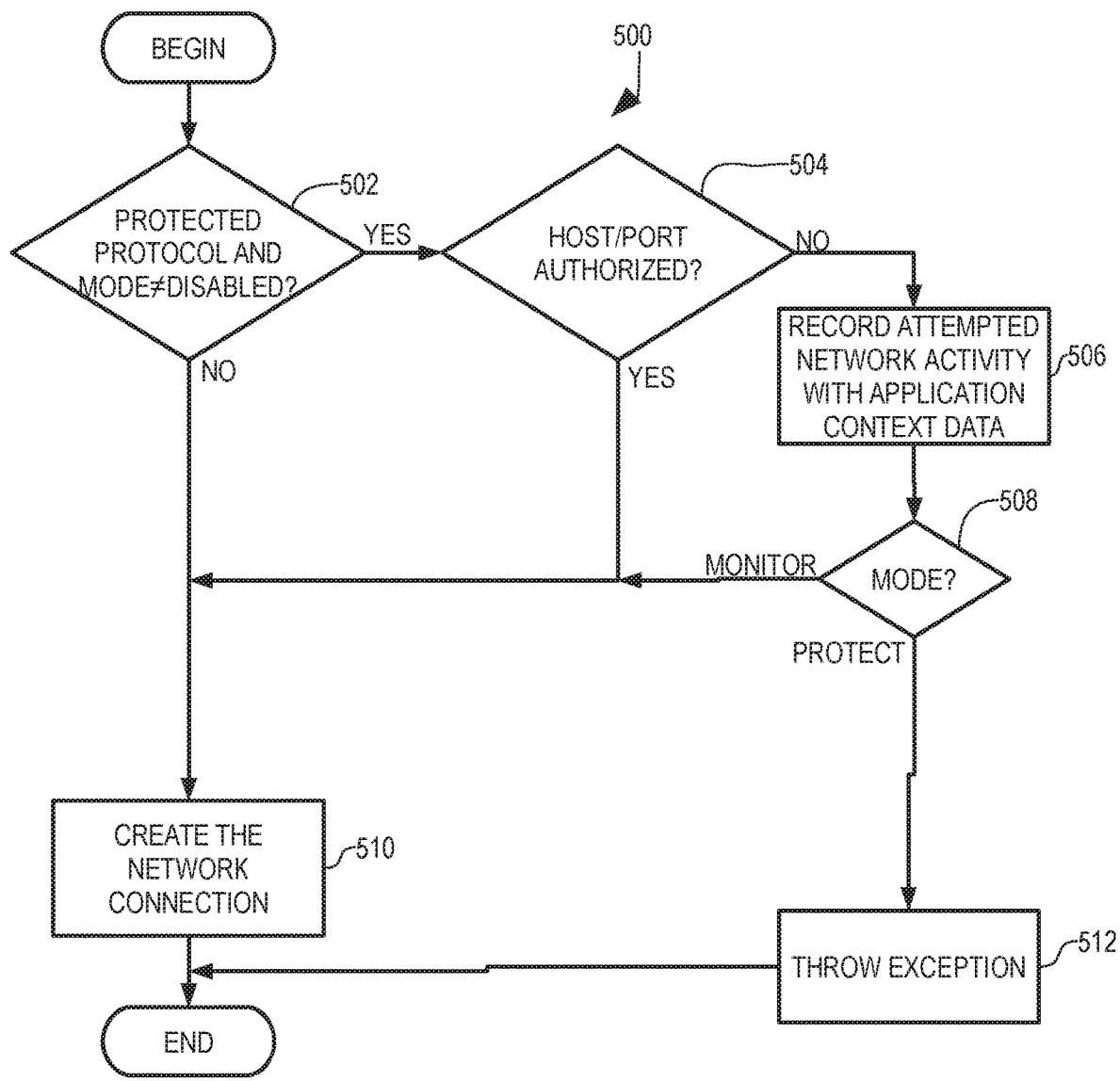
FIG. 5 is a logic flow diagram illustrating performance of application-aware network security in accordance with one embodiment of the present invention.

The processing of network connection creation by RASP logic 402 is illustrated by logic flow diagram 500 (FIG. 5). In the context of logic flow diagram 500, the particular network connection application logic 320 is trying to create is sometimes referred to as "the subject connection".

In test step 502, RASP logic 402 refers to protection mode 406 and protocols 408. If protection mode 406 is not "disabled" and the subject connection is of a protocol identified by protocols 408 as a protocol to process, processing by RASP logic 402 transfers from test step 502 to test step 504. Conversely, if protection mode 406 is "disabled" or the subject connection is not of a protocol identified by protocols 408 as a protocol to process, processing by RASP logic 402 transfers from test step 502 to step 510, which is described below.

In test step 504, RASP logic 402 determines whether the subject connection is to any of the host/port combinations specified in authorized connections 410. If so, processing transfers to step 510 in which RASP logic 402 creates the subject connection, possibly through shared libraries 322. Thus, when the subject connection is identified as authorized by authorized connections 410 or when RASP plug-in 324 is disabled, application logic 320 behaves entirely as it would without RASP plug-in 324.

Conversely, if the subject connection is not to any of the host/port combinations specified in authorized connections 410, processing by RASP logic 402 transfers from test step 504 to step 506. In step 506, RASP logic 402 records information about the attempting of the subject connection and stores the information is a log of operating system 330 (FIG. 3). An example of the information recorded in step 506 (FIG. 5) in this illustrative embodiment is shown as log entry 600 (FIG. 6).

Log entry 600 is in the form of JavaScript Object Notation (JSON) and includes information not available in conventional WAFs and other monitoring/protection tools. Since RASP plug-in 324 is a plug-in coupled to application logic 320, RASP plug-in 324 has access to information otherwise accessible to application logic 320 itself, and this information is recorded in log entry 600. For example, application logic 320 is identified as "Acme" in association with the JSON key, "app".

Log entry 600 also specifies the type of data to be transported through the subject connection: JSON pair "http_ content_type": "application/x-www-form-urlencoded; charset=UTF-8". Log entry 600 specifies the particular component of application logic 320 in which the subject connection request originated. See, e.g., (i) "http_referrer": "http://localhost:8082/acme-webapp-java/"; (ii) "line_number": 100; (iii) "script_name": "File2.java"; and (iv) "stack_trace": "File3.java:150\nFile2.java:100\nFile1.java:50". The text, "File2.java", and the line number, 100, specify a specific line within a source code data file of application logic 320 from which the request for the subject connection is received by RASP plug-in logic 324. The data associated with the key "stack_trace" identifies a number of line numbers within a number of other source code data files whose execution caused line 100 of data file File2.java to request the subject connection. This information assists computer engineers in identifying, with great specificity, the particular portion of application logic 320 in which creation this unauthorized network connection is requested. This information, being internal to application logic 320, is not available to WAFs.

Log entry 600, having access to otherwise accessible to application logic 320 only, also includes data indicative of the attacker. For example, log entry 600 includes (i) "cookies": {"JSESSIONID": "e6qem5upsajc194ghyl48sokj"} identifying the specific session in which the attack was launched and (ii) "session_attributes": {"ACME Username": "acme_default_user", "ACME Role": "user"} identifying the authenticated user of the session in which the attack was launched.

Thus, log entry 600 helps computer engineers responsible for the proper functioning of application logic 320 to identify (i) the specific part of application logic 320 that is susceptible to a detected attack and (ii) the remote source of the attack. Log entry 600 does this using information that is not ordinarily available outside application logic 320.

Returning to logic flow diagram 500 (FIG. 5), processing by RASP logic 402 transfers from step 506 to test step 508. In test step 508, RASP logic 402 determines whether protection mode 406 is "monitor" or "protect". If protection mode 406 is "monitor", processing transfers to step 510 in which RASP logic 402 creates the subject connection as described above. Conversely, if protection mode 406 is "protect", processing transfers to step 512 in which RASP logic 402 throws an exception, i.e., reports an error to application logic 320.

If application logic 320 is already designed according to commonly accepted "best" practices, application logic 320 includes logic for catching such an exception and processing any error arising from a failed attempt to create a network connection. Accordingly, application logic 320 requires no modification to properly handle failure to create a network connection blocked by RASP plug-in 324, in effect gracefully and safely reacting to an attempted XSS attack.

After step 510 or step 512, processing according to logic flow diagram 500 completes.

Figure 7:
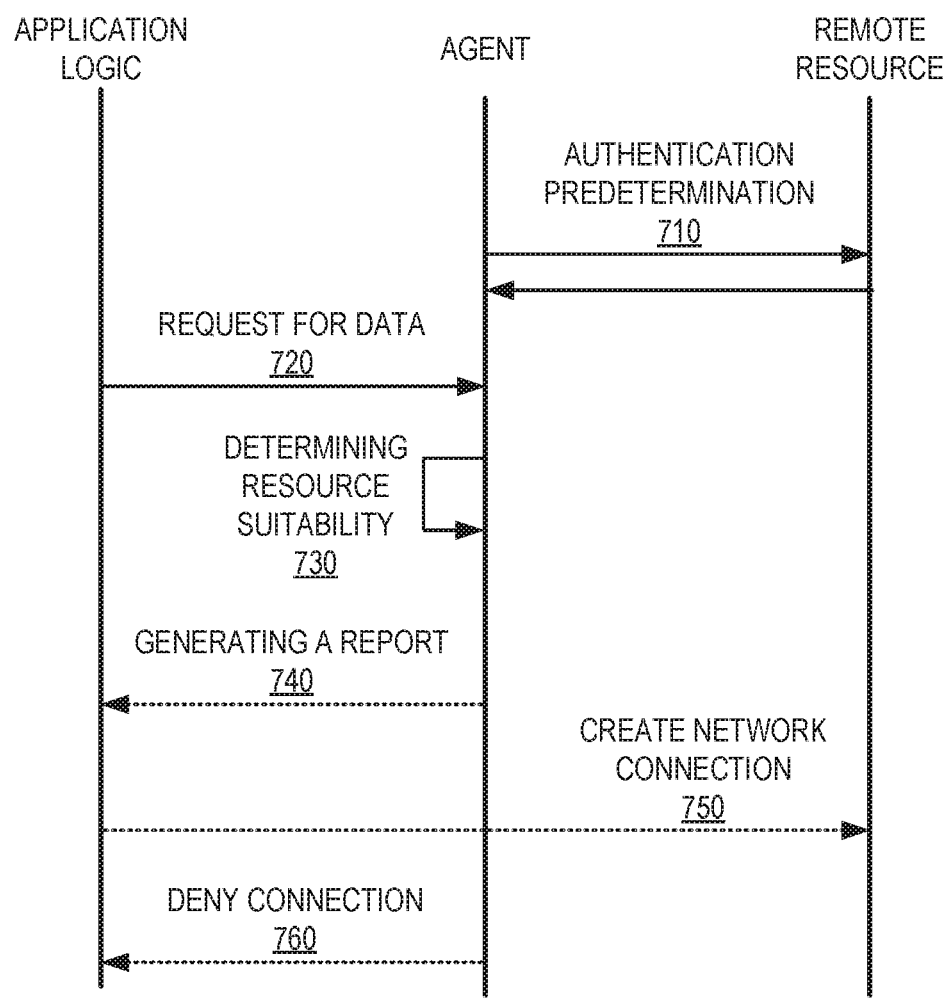
FIG. 7 is a dataflow diagram for active application-aware network security in accordance with one embodiment of the present invention.

Turning now to FIG. 7, a dataflow diagram for active application-aware network security is provided. As noted above, the system operates to monitor and/or protect the network connectivity between the application logic and a remote resource leveraging the RASP agent. Before the RASP agent can monitor network connections it may be necessary to predetermine the authentication of network connections to the remote resources likely to be sought by the application logic (at 710). The resources being sought may include applications, databases, APIs, caches (or other data stores) and the like. This predetermination may be configured by a customer or other human operator, or may involve a risk assessment of the connection IP's reputation. IP reputation assessments may leverage public data sources (such as listings of suspected malicious IPs published by internet security firms and/or crowdsourced), through machine learned determinations, specific flags present, or some combination thereof.

After some subset of the network connections have been predetermined to be authorized, the agent enters the monitoring or protection mode. At this stage the agent can intercept a request by the application logic for data/resource (at 720). The nature of the outbound data is ascertainable by the agent, as well as application logic telemetry. The request for the resource initiates the agent to make a determination if the request is legitimate (at 730) by using the collected information regarding outbound data sensitivity, telemetry data, and the network connectivity being predetermined to be authorized or not.

A legitimate request will result in the agent allowing the application logic to generate a network connection with the remote resource (at 750). Likewise, even if the request is suspect, in the monitor only mode this connection will be allowed to be established. However, if the request is suspect a report will be generated by the agent as previously discussed (at 740). Additionally, if the agent is in a protection mode, the agent will additionally take the step of throwing an exception that causes the connection to be denied (at 760).

Figure 8:
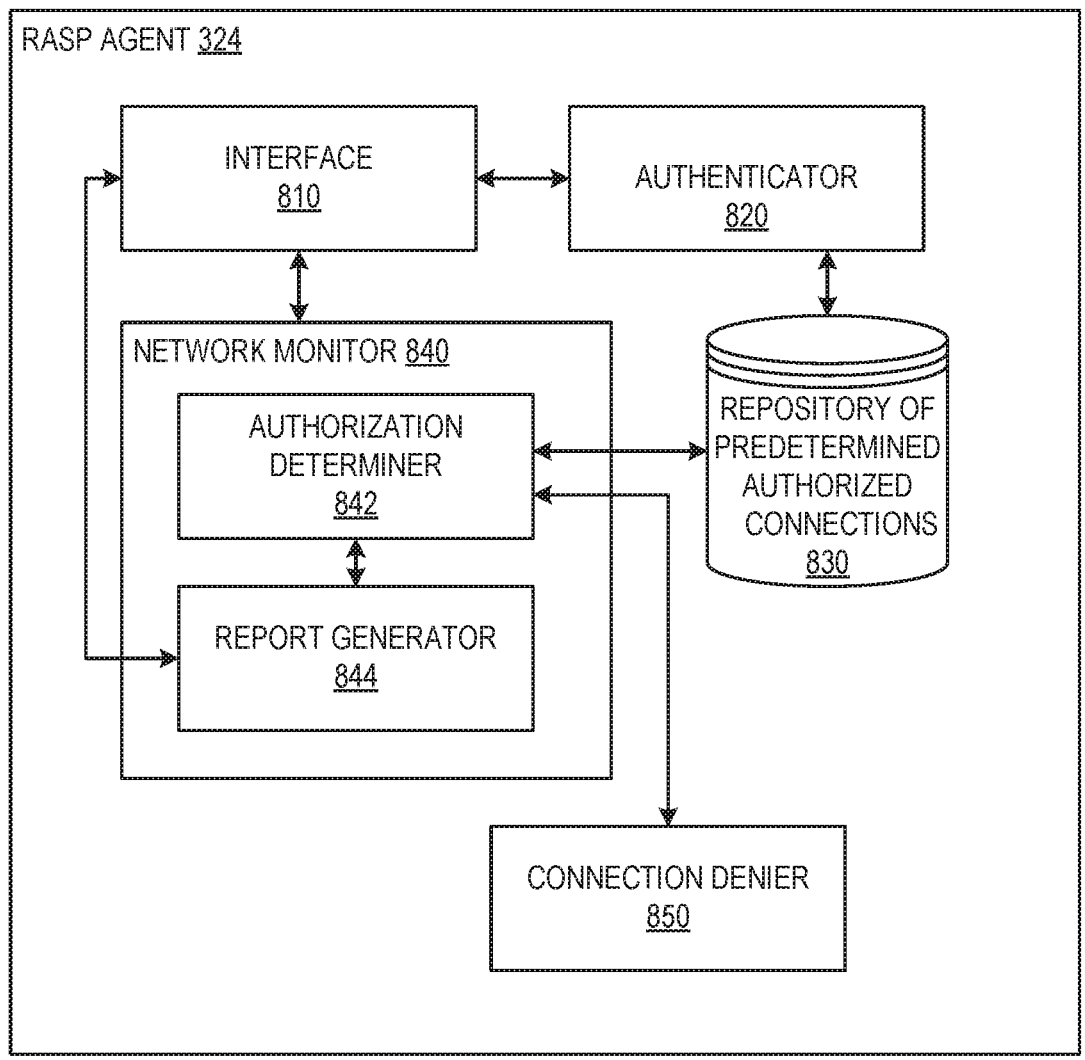
FIG. 8 provides a more detailed architecture diagram of the RASP agent.

FIG. 8 provides a more detailed architecture diagram of the RASP agent 324. An interface 810 interacts with the application logic and any remote resources. An authenticator 820 operates via the interface 810 to determine which external resource network connections are authorized. These predetermined authorized connections are then stored for ready retrieval in a data store 830. The interface 810 also received the resource requests by the application logic and provides this information to the network monitor 840, which includes an authorization determination element 842 which queries if the connection for the resource is already authorized in the data store 830, and further may determine if the outgoing data is logical for the resource. For example if social security information of customers is being sent by the application logic to a resource that would not have any purpose for the information this may also cause the connection to be flagged even if the connection has been predetermined to be authorized.

Illegitimate resource requests, as decided by the authorization determiner 842, will cause the report generator 844 to prepare and output an incident report as discussed. In monitoring mode, the connection may still be allowed to progress however. In contrast, when the agent 324 is in protection mode, a connection denier 850 may cause the connection to fail.

The above description is illustrative only and is not limiting. The present invention is defined solely by the claims which follow and their full range of equivalents. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

What is claimed is:

1. A method for improving security of computer application logic that is configured to provide a network service, the method comprising:

receiving request data from the computer application logic at an agent of a server computer wherein the request data represents a request to create a network connection in a session between the computer application logic and a remotely-located resource, wherein the agent is connected to the computer application logic with hooks that cause network connections created by the computer application logic to be processed by the agent;

determining, by the agent, that the requested network connection is not one of one or more predetermined authorized network connections associated with the computer application logic; and in response to the determining, denying the request, throwing an exception that indicates that the request has been denied, and generating and recording exception report data by the agent, wherein the computer application logic includes logic to catch the exception and process the denial of the request, wherein the exception report data includes:

request origination data that identifies a component of the computer application logic from which the request data is received by specifying a first source code data file and a line number identifying a particular line of the first source code data file from which the request data originated;

network connection data that identifies a host and port associated with the requested network connection that the agent used to determine that the requested network connection is not one of the one or more predetermined authorized network connections associated with the computer application logic; and user identification data that identifies a user.

2. The method of claim 1 wherein the predetermined authorized network connections are specified by one or more selected from the group consisting essentially of: remote host identification data, port identification data, and network protocol identification data.

3. The method of claim 1 wherein the agent is within the computer application logic as a plugin capable of intercepting application telemetry and sensitive outbound data types, wherein the application telemetry and sensitive outbound data types are used in the determination.

4. The method of claim 1 wherein the request origination data identifies the component of the computer application logic from which the request data is received by also specifying one or more source code data files and associated line numbers identifying particular lines of the one or more source code data files whose execution caused the component identified by the first source code and the line number to send the request data.

5. The method of claim 1 wherein the user identification data identifies the user by specifying one or more selected from the group consisting essentially of: a user name associated with the user within the computer application logic, a role of the user, and data identifying the session.

6. The method of claim 1 wherein the remotely-located resource includes any of applications, APIs, rest services, micro services, databases and data stores.

7. The method of claim 1 wherein the one or more network connections are predetermined to be authorized or not by customer definition or IP reputation assessment.

8. The method of claim 7 wherein the IP reputation assessment is performed by machine learning algorithms, publicly available information, specific flags, or a combination thereof.

9. The method of claim 1, wherein
denying the request comprises declining to create the network connection.

10. A system for improving security of computer application logic that is configured to provide a network service, the system comprising:

a network monitor of a server computer for receiving request data from the computer application logic at an agent wherein the request data represents a request to create a network connection in a session between the computer application logic and a remotely-located resource, wherein the agent is connected to the computer application logic with hooks that cause network connections created by the computer application logic to be processed by the agent;

an authorization determiner of the server computer for determining that the requested network connection is not one of one or more predetermined authorized network connections associated with the computer application logic;

a connection denier of the server computer that, in response to the determining, denies the request and throws an exception that indicates that the request has been denied, wherein the computer application logic includes logic to catch the exception and process the denial of the request; and a report generator of the server computer that, in response to the determining, generates and records exception report data, wherein the exception report data includes:

request origination data that identifies a component of the computer application logic from which the request data is received by specifying a first source code data file and a line number identifying a particular line of the first source code data file from which the request data originated;

network connection data that identifies a host and port associated with the requested network connection that the authorization determiner used to determine that the requested network connection is not one of the one or more predetermined authorized network connections associated with the computer application logic; and user identification data that identifies a user.

11. The system of claim 10 wherein the predetermined authorized network connections are specified by one or more selected from the group consisting essentially of:
remote host identification data, port identification data, and network protocol identification data.

12. The system of claim 10 wherein the agent is within the computer application logic as a plugin capable of intercepting application telemetry and sensitive outbound data types, wherein the application telemetry and sensitive outbound data types are used in the determination.

13. The system of claim 10 wherein the request origination data identifies the component of the computer application logic from which the request data is received by also specifying one or more source code data files and associated line numbers identifying particular lines of the one or more source code data files whose execution caused the component identified by the first source code and the line number to send the request data.

14. The system of claim 10 wherein the user identification data identifies the user by specifying one or more selected from the group consisting essentially of: a user name associated with the user within the computer application logic, a role of the user, and data identifying the session.

15. The system of claim 10 wherein the remotely-located resource includes any of applications, APIs, rest services, micro services, databases and data stores.

16. The system of claim 10 wherein the one or more network connections are predetermined to be authorized or not by customer definition or IP reputation assessment.

17. The system of claim 16 wherein the IP reputation assessment is performed by machine learning algorithms, publicly available information, specific flags, or a combination thereof.

18. The system of claim 10, wherein denying the request comprises declining to create the network connection.

* * * * *